(12) United States Patent
Lowe

(10) Patent No.: US 10,793,273 B2
(45) Date of Patent: Oct. 6, 2020

(54) PAYLOAD DROPPING MECHANISM FOR UNMANNED AERIAL VEHICLE

(71) Applicant: Microdrones GmbH, Siegen (DE)

(72) Inventor: Falk Lowe, Buren (DE)

(73) Assignee: MICRODRONES GMBH (DE)

( * ) Notice: Subject to any disclaimer, the term of this patent is extended or adjusted under 35 U.S.C. 154(b) by 405 days.

(21) Appl. No.: 15/712,422

(22) Filed: Sep. 22, 2017

(65) Prior Publication Data
US 2018/0086461 A1    Mar. 29, 2018

(51) Int. Cl.
*B64D 1/12*    (2006.01)
*B64C 39/02*   (2006.01)

(52) U.S. Cl.
CPC .............. *B64D 1/12* (2013.01); *B64C 39/024* (2013.01); *B64C 2201/027* (2013.01); *B64C 2201/108* (2013.01); *B64C 2201/128* (2013.01)

(58) Field of Classification Search
CPC .... B64D 1/12; B64D 1/02; B64D 1/08; B64C 2201/128
See application file for complete search history.

(56) References Cited

U.S. PATENT DOCUMENTS

| 6,056,237 | A | 5/2000 | Woodland |
| 10,308,360 | B2 * | 6/2019 | Sopper ...................... B65D 5/18 |
| 2011/0084162 | A1 | 4/2011 | Goossen et al. |
| 2013/0240673 | A1 | 9/2013 | Schlosser et al. |
| 2015/0239559 | A1 * | 8/2015 | Uskert ...................... E05C 1/14 |
| | | | 244/137.4 |
| 2019/0152600 | A1 * | 5/2019 | Kuk ........................ B64C 27/08 |

FOREIGN PATENT DOCUMENTS

DE    202015105415 U1 * 10/2015 ............. A62B 99/00
DE    20 2015 105 415 U1    12/2015

* cited by examiner

*Primary Examiner* — Richard G Davis
(74) *Attorney, Agent, or Firm* — Fishman Stewart PLLC

(57) ABSTRACT

The invention relates to an unmanned aerial vehicle having a dropping device (20) for a first load (21) and a second load (22). The dropping device (20) comprises an actuation element (31) which performs a first movement in order to drop the first load (21) and which performs a second movement in order to drop the second load (22). The invention also relates to an associated method.

19 Claims, 2 Drawing Sheets

PAYLOAD DROPPING MECHANISM FOR UNMANNED AERIAL VEHICLE

TECHNICAL FIELD

The invention relates to a payload dropping mechanism for an unmanned aerial vehicle.

SUMMARY OF THE INVENTION

The invention relates to an unmanned aerial vehicle having a dropping device for a first load and a second load. The invention also relates to a method for dropping a first load and a second load from an unmanned aerial vehicle.

Unmanned aerial vehicles can be used to transport articles to a location which is otherwise accessible only with difficulty. This is of interest for example if persons are in need at the location. Such persons may be assisted with relief supplies or rescue materials. It is for example also possible that measurements are to be performed at the inaccessible location and the aerial vehicle is used to transport the required sensors to the location of the measurement. By means of the dropping device, the aerial vehicle can be automatically separated from its load.

The invention is based on the object of proposing an unmanned aerial vehicle and associated method which enable the loads to be dropped with little technical outlay.

In the case of the unmanned aerial vehicle according to the invention, a passage opening is provided in a structural component, through which passage opening a projection of the load can be led. The dropping device comprises a locking element which, in the connected state, engages into an opening of the load. A dropping device of the aerial vehicle comprises an actuation element which performs a first movement in order to drop the first load and which performs a second movement in order to drop the second load.

The first movement and the second movement of the actuation element take place successively in terms of time. A state of the unmanned aerial vehicle thus exists in which the first load has already been dropped, whereas the second load is still connected to the aerial vehicle.

The invention is based on the recognition that, in general, there is only a limited available number of communication channels for transmitting control commands in the direction of the unmanned aerial vehicle. Through the use of the same actuation element for dropping the first load and for dropping the second load, only one element has to be actuated. This is conducive to effective utilization of the available communication channels.

The first movement and the second movement of the movement element may have a corresponding movement direction. The expression "movement direction" comprises linear movements but also other types of movements, such as for example rotational movements or pivoting movements. By means of such movements, too, a (non-linear) movement path can be defined along which an element can move in a movement direction. If both movements have the same movement direction, the communication is further simplified, because no information regarding the movement direction has to be transmitted.

The dropping device according to the invention may comprise a first fastening mechanism, which is assigned to the first load, and a second fastening mechanism, which is assigned to the second load. In a first state of the fastening mechanism, the associated load is connected to the unmanned aerial vehicle. In a second state of the fastening mechanism, the associated load is not connected to the unmanned aerial vehicle. Thus, if the aerial vehicle is in the air when the fastening mechanism is moved from the first state into the second state, the associated load can be released from the aerial vehicle and fall downward. If the aerial vehicle is on the ground when the fastening mechanism is in the second state, then the aerial vehicle can take off with the load remaining on the ground. Both of these situations are referred to in the context of the invention as "dropping".

There are numerous possibilities for the design of the individual fastening mechanism of the dropping device. It is preferable for each of the fastening mechanisms to comprise one or more of the following features.

The In a weight-saving variant, the load comprises a projection which is designed to be led through a passage opening in a structural component of the unmanned aerial vehicle. The projection may be oriented upward when the aerial vehicle is in its normal orientation. This has the advantage that the projection can be released from the passage opening under the influence of gravitational force when the fastening mechanism is in the second state.

The projection and the passage opening can thus be adapted to one another such that a rotational movement of the load about an axis of the passage opening is prevented. Then, no further element is necessary in order to prevent undesired rotational movements between the load and the structural component of the unmanned aerial vehicle. For example, the passage opening may be in the form of a slot, and the projection may have a shape fitting said slot.

The fastening mechanism may comprise a locking element which engages with the projection of the load when the fastening mechanism is in the first state. The engagement may be realized in a section of the projection which is inserted into the passage opening of the structural component, in particular in a section of the projection which projects out on the other side of the structural component. In particular, the projection may have a bore through which the locking element is led. To move the fastening mechanism from the first state into the second state, the engagement between the locking element and the projection is released, such that the projection can be pulled out of the passage opening.

In the state in which both loads are connected to the structural component of the aerial vehicle, the engagement of the second locking element with the second load may be more pronounced than the engagement of the first locking element with the first load. In this way, it is made possible for the two locking elements to be caused to perform an identical movement, which results in only one of the loads being dropped whilst the other remains connected to the aerial vehicle. If the locking elements are led through bores in the loads, then the second locking element may be inserted into the bore of the second load to a greater depth than the first locking element is inserted into the bore of the first load.

The actuation element may be coupled to the locking element such that a movement of the actuation element is converted into a movement of the locking element. The fastening mechanism can then be moved from the first state into the second state by means of a movement of the actuation element.

The actuation element according to the invention may be connected to a drive motor by means of which the actuation element is set in rotation. The locking element may be connected to a point of the actuation element which is remote from the axis of rotation of the drive motor, such that said section moves along a circular path when the drive motor rotates. If the load is released from the structural component by means of a linear movement of the locking element, a conversion of the movement along a circular path into a linear movement is necessary. This conversion may be realized for example by virtue of the locking element being inherently flexible and a section adjacent to the load being guided linearly along a guide surface.

The dropping device may comprise a first locking element, which extends from the actuation element to the first fastening mechanism, and a second locking element, which extends from the actuation element to the second fastening element. The locking elements may be articulated at different articulation points of the actuation element. In relation to the axis of rotation of the drive motor, the angle difference between the articulation points may be at least 90°, preferably at least 120°, more preferably at least 150°. In a preferred embodiment, the articulation points are offset by 180°, which means that the position of the articulation points can be interchanged by means of a rotation of the drive motor through 180°.

The dropping device may be designed such that the actuation element is in a first position when both fastening mechanisms are closed, that is to say when the loads are connected to the aerial vehicle. The actuation element can be moved into a second position in order to open the first fastening mechanism, whilst the second fastening mechanism remains closed. From the second position, the actuation element can be moved into a third position, in which the second fastening mechanism is also open.

If the actuation element is connected to the drive motor, it may be provided that, for the movement from the first position into the second position, the drive motor is rotated through a first angle of rotation. For the movement from the second position into the third position, the drive motor may be rotated through a second angle of rotation. The first angle of rotation and the second angle of rotation may for example lie between 10° and 45°. The first angle of rotation and the second angle of rotation may be equal. In the context of the invention, the two movements have the same movement direction if the drive motor rotates twice in the same direction.

The dropping device according to the invention may comprise a receiver unit for receiving control signals. The control signals may be transmitted to the receiver unit by radio, for example. The control signal for triggering the first movement of the actuation element may be identical to the control signal for triggering the second movement of the actuation element.

For an even weight distribution, the two loads may be arranged so as to enclose between them a vertical plane which extends through the center of gravity of the aerial vehicle. The actuation element may be arranged between the loads. The actuation element may be intersected by the vertical plane which extends through the center of gravity of the aerial vehicle.

In the context of the invention, a load may encompass multiple individual articles. It is possible for the aerial vehicle according to the invention to be designed such that more than two loads can be dropped. For example, it may be the case that a third load can be dropped by means of a third movement of the actuation element, a fourth load can be dropped by means of a fourth movement of the actuation element, etc. It is preferable if all movements of the actuation element have a corresponding movement direction.

The invention also relates to a method for dropping a first load and a second load from an unmanned aerial vehicle. In the method, a projection of a first load is inserted into a first passage opening in a structural component of the aerial vehicle, and a projection of a second load is inserted into a second passage opening in a structural component of the aerial vehicle. A first locking element, in the connected state, engages into an opening of the first load, and a second locking element, in the connected state, engages into an opening of the second load. An actuation element is set in motion in order to release the first locking element from the first load. At a later point in time, the same actuation element is set in motion in order to release the second locking element from the second load. The method may be refined with further features described in conjunction with the aerial vehicle according to the invention.

BRIEF DESCRIPTION OF THE DRAWINGS

The invention will be described by way of example below with reference to the appended drawings on the basis of advantageous embodiments. In the drawings.

Although the drawings represent embodiments of the present invention, the drawings are not necessarily to scale and certain features may be exaggerated in order to illustrate and explain the present invention. The exemplification set forth herein illustrates an embodiment of the invention, in one form, and such exemplifications are not to be construed as limiting the scope of the invention in any manner.

DESCRIPTION OF THE PREFERRED EMBODIMENT

Figure 1:
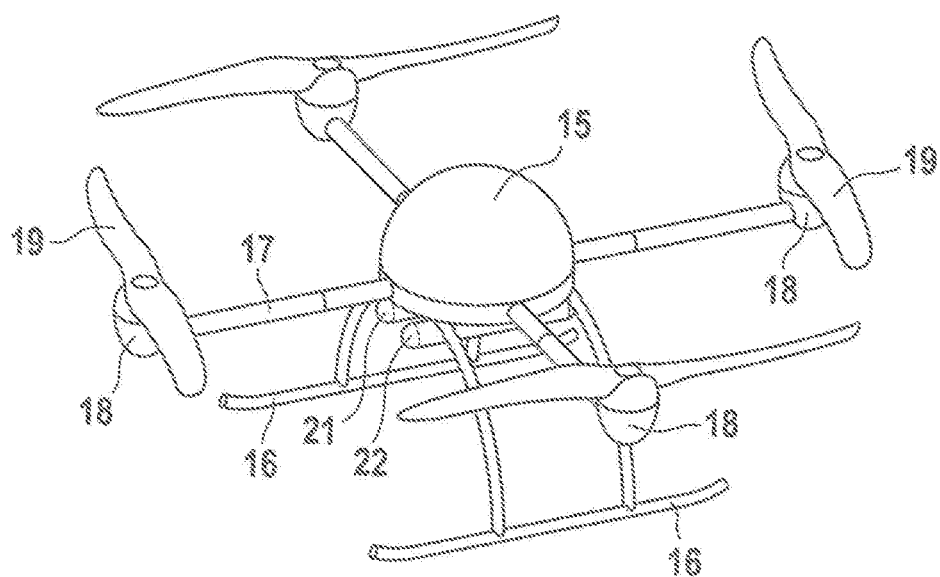
FIG. 1, shows an unmanned aerial vehicle according to the invention.

An unmanned aerial vehicle shown in FIG. 1 comprises a fuselage body 15 with skids 16 on which the aerial vehicle stands when it is on the ground. Four supporting struts 17 extend outward from the fuselage body 15. A drive motor 18 for driving a rotor 19 is arranged on the outer end of each supporting strut 17. For takeoff, the rotors 19 are set in rotation in opposite directions, such that the aerial vehicle lifts off vertically upward. Through suitable activation of the drive motors 18, the aerial vehicle can then be steered in targeted fashion along desired flight paths.

On the underside of the fuselage body 15 there are suspended two rescue units 21, 22 which automatically inflate when they come into contact with water. The rescue units 21, 22 are intended for persons that are in distress at sea. The unmanned aerial vehicle can fly to the person in distress at sea and drop the first rescue unit 21 there from a low flying height. The unmanned aerial vehicle can then fly to a further location, at which another person is in distress at sea, in order to drop the second rescue unit 22. In the interior of the fuselage body 15 there is accommodated a dropping unit 20 (not visible in FIG. 1) by means of which the rescue units 21, 22 can be dropped independently of one another and temporally one after the other. The rescue units form loads 21, 22 in the context of the invention.

Figure 2:
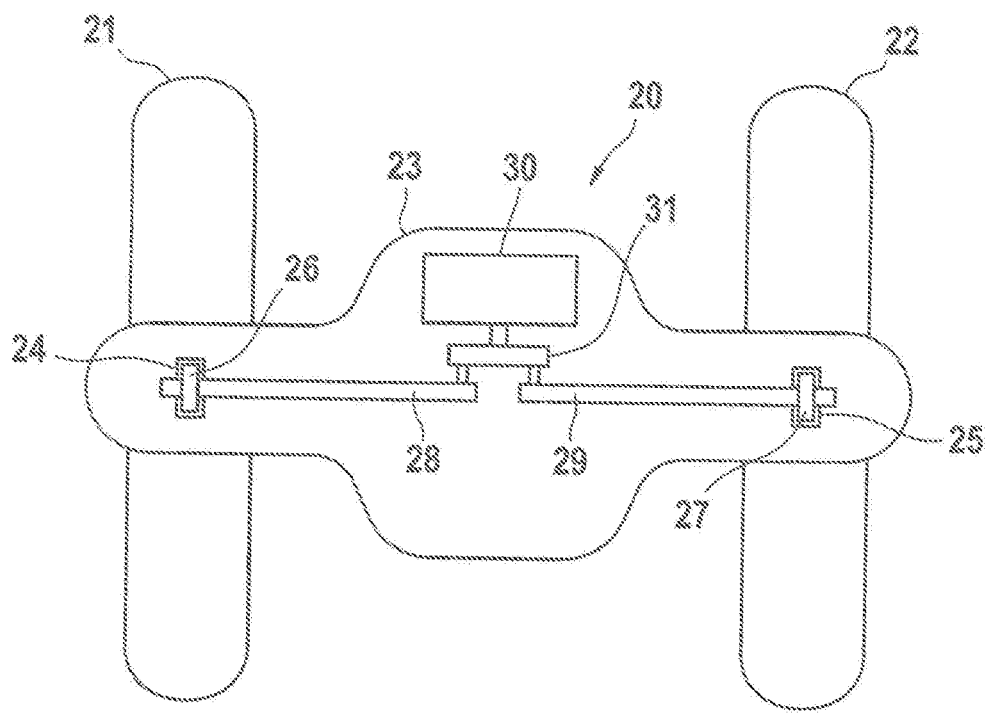
FIG. 2, shows a view of a dropping device according to the invention from above.

As per FIG. 2, the dropping device 20 comprises a structural component 23 which is fixedly connected to the unmanned aerial vehicle. Two rectangular passage openings 24, 25 are formed in the structural component 23. A projection 26 arranged on the upper end of the first rescue unit 21 is inserted into the first passage opening 24. The projection 26 has a rectangular cross section which fits the passage opening 24, such that the projection 26 cannot be rotated within the opening 24.

The projection 26 is equipped with a bore which is arranged above the structural component 23. The projection 26 is fixed in this position by means of a locking element 28 which is passed through the bore. The rescue unit 21 cannot be released from the structural component 23 for as long as the projection 26 is blocked by the locking element 28.

The second rescue unit 22 is connected to the structural component 23 in a corresponding manner. A projection 27 of the rescue unit 22 is led through a passage opening 25 in the structural component 23, such that a bore of the projection 27 is arranged above the structural component 23. A second locking element 29 is inserted through the bore of the projection 27. The end of the locking element 29 projects out of the bore of the projection 27 further than the end of the locking element 28 projects out of the bore of the projection 26.

The outer ends of the locking elements 28, 29 are guided along the surface of the structural component 23 such that the locking elements 28, 29 extend substantially rectilinearly through the bores of the projections 26, 27. The two inner ends of the locking elements 28, 29 are connected to an actuation element 31 which is connected to the motor shaft of a drive motor 30. The drive motor 30 comprises a receiver unit 32 for receiving control commands.

Figure 3:
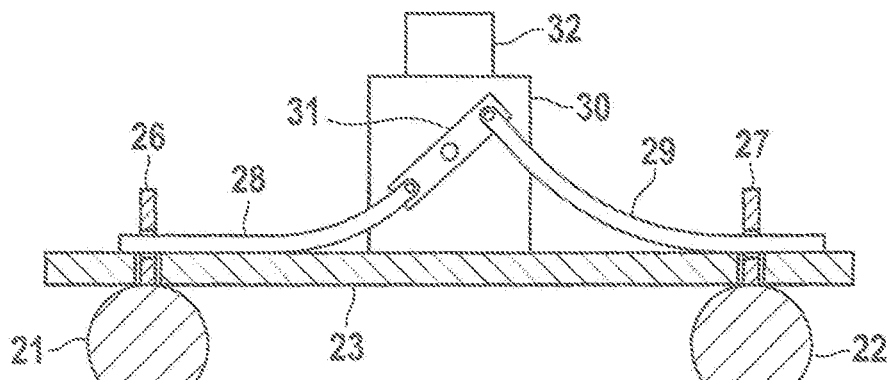
FIG. 3, shows the dropping device as per FIG. 2 in a side view in a partially sectional illustration.

FIG. 3 illustrates the state of the dropping device 20 in which both rescue units 21, 22 are connected to the structural component 23. After the receipt of a control command to drop one rescue unit 21, the drive motor 30 rotates its motor shaft through approximately 45°, whereby the actuation element 31 is rotated counterclockwise in FIG. 3, such that the dropping device 20 moves into the state as per FIG. 4. The fastening element 28 has been pulled out of the projection 26 of the rescue unit 21. The rescue unit 21 is thereby released from the structural component 23 and falls downward under the influence of gravitational force. The second locking element 29 is pulled back only slightly, such that the locking element 29 continues to extend through the bore in the projection 27 of the second rescue unit 22. The second rescue unit 22 thus remains connected to the structural component 23.

At a later point in time, the receiver unit 32 receives another control command, in response to which the drive motor 30 rotates its motor shaft through 45° proceeding from the state shown in FIG. 4. The actuation element 31 moves into the state as per FIG. 5. The second locking element 29 is pulled out of the bore of the projection 27 of the second rescue unit 22, such that the second rescue unit 22 can also detach from the structural component 23 in a downward direction.

The two locking elements 28, 29 are flexible plastics strips which are elastically flexible in an upward and downward direction. The vertical movement associated with the rotation of the actuation element 31 can thereby then be elastically accommodated by the locking element 28, 29.

Figure 4:
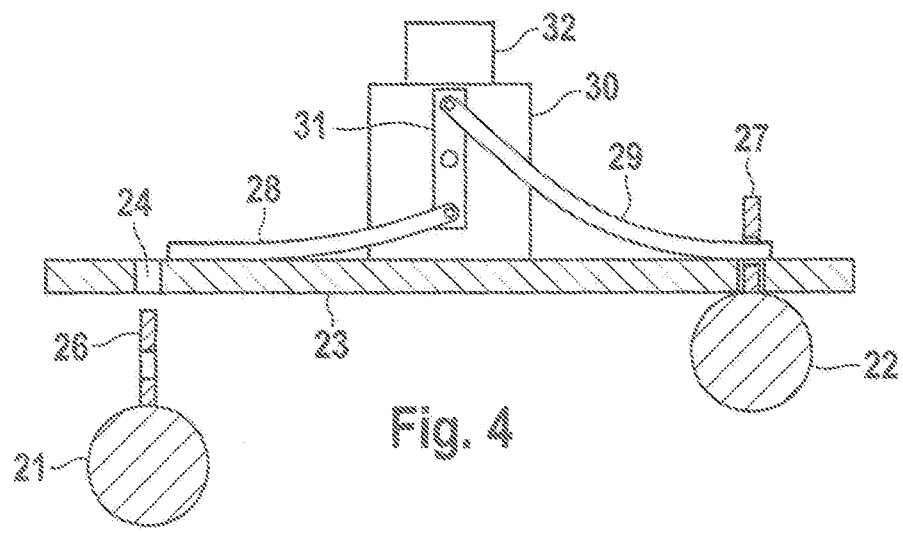
FIG. 4, shows the view as per FIG. 3 in another state of the dropping device.
Figure 5:
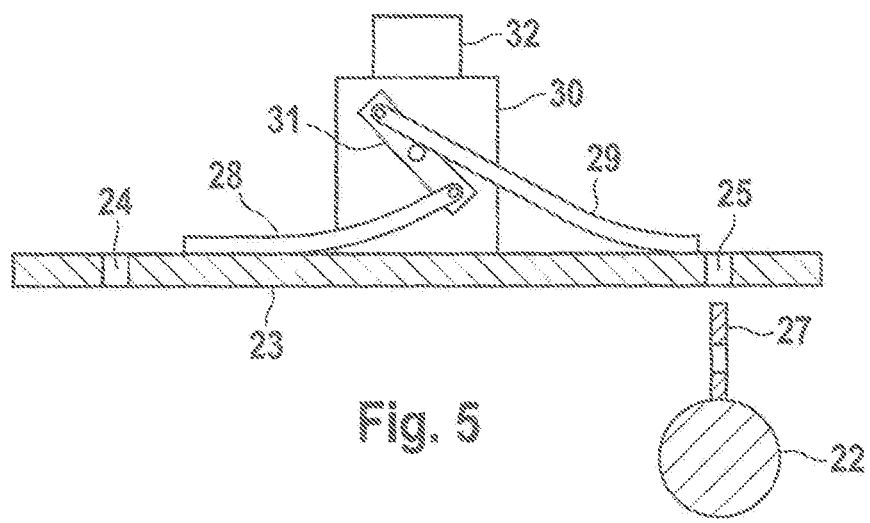
FIG. 5, shows the view as per FIG. 4 in another state of the dropping device.

Upon the transition from the state shown in FIG. 3 to the state shown in FIG. 4, and upon the transition from the state shown in FIG. 4 to the state shown in FIG. 5, the drive motor 30 rotates twice in the same direction of rotation and by the same angle of rotation. The drive motor 30 may consequently be addressed with an identical control signal twice, such that, for the dropping of the rescue units 21, 22, communication channels are occupied only to a very small degree.

It is to be understood that the invention has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for illustrative purposes and convenience and are not in any way limiting, the invention, which is defined by the following claims as interpreted according to the principles of patent law, including the Doctrine of Equivalents, may be practiced otherwise than is specifically described.

The invention claimed is:

1. An unmanned aerial vehicle having a dropping device for a first load and a second load, the dropping device comprising an actuation element which performs a first movement in order to drop the first load and which performs a second movement in order to drop the second load, the aerial vehicle having a first passage opening in a structural component, through which a projection of the first load can be led, and a second passage opening in the structural component, through which a projection of the second load can be led, and the dropping device comprising a first locking element which, in a connected state of the first load, engages into an opening of the first load, and a second locking element which, in a connected state of the second load, engages into an opening of the second load.

2. The aerial vehicle as claimed in claim 1, wherein the first movement and the second movement of the actuation element have a corresponding movement direction.

3. The aerial vehicle as claimed in claim 1, wherein the projection of the first load and the projection of the second load are oriented upward.

4. The aerial vehicle as claimed in claim 1, wherein the projection of the first load and the first passage opening are adapted to one another such that a rotational movement of the first load about an axis of the first passage opening is prevented.

5. The aerial vehicle as claimed in claim 1, wherein the engagement of the second locking element with the second load is more pronounced than the engagement of the first locking element with the first load.

6. The aerial vehicle as claimed in claim 1, wherein the actuation element is connected to a drive motor which is designed to set the actuation element in rotation.

7. The aerial vehicle as claimed in claim 6, wherein, for the first movement and the second movement of the actuation element, the drive motor is rotated in the same direction.

8. The aerial vehicle as claimed in claim 6, wherein, for the first movement and the second movement of the actuation element, the drive motor is rotated through the same angle of rotation.

9. A method for dropping a first load and a second load from an unmanned aerial vehicle, wherein a projection of a first load is inserted into a first passage opening in a structural component of the aerial vehicle, in which method a projection of a second load is inserted into a second passage opening in the structural component of the aerial vehicle, in which method a first locking element, in a connected state of the first load, engages into an opening of the first load, in which method a second locking element, in a connected state of the second load, engages into an opening of the second load, and in which method an actuation element is set in motion in order to release the first locking element from the first load, and in which method, at a later point in time, the same actuation element is set in motion in order to release the second locking element from the second load.

10. An unmanned aerial vehicle having a dropping device for a first load and a second load, the dropping device comprising an actuation element which performs a first rotational movement to effect drop of the first load and which performs a second rotational movement to effect drop of the second load, the aerial vehicle having a shaped first passage opening in a structural component, through which a shaped projection of the first load is slip fit, and a shaped second passage opening in the structural component, through which a shaped projection of the second load is slip fit, and the dropping device comprising a first locking element which, in a connected state of the first load, engages into an opening of the first load to prevent dropping of the first load, and a second locking element which, in a connected state of the second load, engages into an opening of the second load to prevent dropping of the second load.

11. The aerial vehicle as claimed in claim 10, wherein said first and second locking elements are elongated and disposed in a coplanar relationship with said actuation element.

12. The aerial vehicle as claimed in claim 11, wherein said first and second locking elements each have a first end pivotally affixed to said actuation element.

13. The aerial vehicle as claimed in claim 12, wherein said first and second locking elements each have an opposite end portion extending through an associated load projection bore to prevent dropping of the load.

14. The aerial vehicle as claimed in claim 13, wherein said first and second locking elements are formed of resilient material.

15. The aerial vehicle as claimed in claim 13, wherein said first and second locking elements are formed of resilient plastic material.

16. The aerial vehicle as claimed in claim 10, wherein said actuation element is elongated and is configured for unirotational displacement about a central axis, and wherein said first and second locking elements each have a first end pivotally affixed to an opposed end of said actuation element, where upon rotation of said actuation element in one direction, each of the opposite end portions of said first and second locking elements converge and upon rotation of said actuation element in an opposite direction, each of the opposite end portions of said first and second locking elements diverge.

17. The aerial vehicle as claimed in claim 16, wherein said activation element is substantially equally spaced between said loads and one of said locking elements is axially shorter than the other.

18. The aerial vehicle as claimed in claim 10, wherein said structural component shaped passage openings are substantially rectangular.

19. The aerial vehicle as claimed in claim 10, wherein said load shaped projections are substantially rectangular in cross section.

* * * * *

UNITED STATES PATENT AND TRADEMARK OFFICE
CERTIFICATE OF CORRECTION

PATENT NO.       : 10,793,273 B2
APPLICATION NO.  : 15/712422
DATED            : October 6, 2020
INVENTOR(S)      : Falk Lowe It is certified that error appears in the above-identified patent and that said Letters Patent is hereby corrected as shown below:

On the Title Page

At Column 1, Item (30) Foreign Application Priority Data, please add the missing priority information:
Sep. 23, 2016 (EP).... EP16190270

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*